United States Patent [19]

Nahmias

[11] 4,333,968

[45] Jun. 8, 1982

[54] THERMOPLASTIC PACKAGING FILMS WITH IMPROVED HEAT-SEAL CHARACTERISTICS

[75] Inventor: A. Michael Nahmias, Canandaigua, N.Y.

[73] Assignee: Mobil Oil Corporation, New York, N.Y.

[21] Appl. No.: 115,530

[22] Filed: Jan. 25, 1980

[51] Int. Cl.³ .......................... B05D 3/02; B05D 3/12; B05D 3/00; B32B 27/08
[52] U.S. Cl. ..................... 427/173; 427/359; 427/369; 427/393.5; 427/398.2; 428/516; 428/517; 428/518; 428/519; 428/520; 428/349; 428/355
[58] Field of Search ..................... 427/173, 316, 393.5, 427/359, 369, 398.2; 428/517, 518, 519, 520, 349, 355

[56] References Cited

U.S. PATENT DOCUMENTS

| | | |
|---|---|---|
| 3,232,789 | 2/1966 | Pelzek et al. |
| 3,285,766 | 11/1966 | Barkis et al. ..................... 427/173 X |
| 3,508,944 | 4/1970 | Henderson et al. |
| 3,519,531 | 7/1970 | James et al. |
| 4,086,317 | 4/1978 | Miyabe ........................... 427/173 X |
| 4,147,827 | 4/1979 | Breidt et al. |

FOREIGN PATENT DOCUMENTS

| | | | |
|---|---|---|---|
| 49-66220 | 9/1974 | Japan ................................ 427/393.5 |
| 1176204 | 1/1970 | United Kingdom ................ 427/173 |

Primary Examiner—Michael R. Lusignan
Attorney, Agent, or Firm—Charles A. Huggett; Michael G. Gilman; James P. O'Sullivan

[57] ABSTRACT

Biaxially oriented polypropylene films are extrusion coated with an ethylene-vinyl acetate copolymer coating to yield a coated film product exhibiting heat-seals which are peelable and which exhibit good heat-seal strengths.

1 Claim, No Drawings

4,333,968

THERMOPLASTIC PACKAGING FILMS WITH IMPROVED HEAT-SEAL CHARACTERISTICS

BACKGROUND OF THE INVENTION

1. Field of the Invention

The present invention relates to thermoplastic packaging films which are capable of forming a peelable heat-seal so that the sealed film may be reopened without tearing or rupturing of the film layers.

2. Description of the Prior Art

In the past, thin thermoplastic films have been widely used for the packaging of a wide variety of commodities and have found particular widespread acceptance in the packaging of foodstuffs. Included in such thermoplastic packaging films are films such as biaxially oriented polypropylene, which is particularly suited for use in such applications because of its excellent optical and mechanical properties. In addition, it offers excellent moisture barrier characteristics. In the past, expanded usage of this type of film for packaging has been hampered somewhat by its inability to offer good heat-seal characteristics over a wide temperature range. One prior art technique which has been employed to remedy this has been the application of heat-sealable coatings onto the film surface after the film has been formed and oriented. However, such coating applications following film orientation are extremely costly and require expensive equipment including drying ovens, solvent recovery systems, and the like.

An alternate means for application of heat-sealable coatings onto the surface of films such as polypropylene, comprises the extrusion of a surface layer of thermoplastic onto a polypropylene film substrate. A thermoplastic coating resin is selected which has a melting point below that of the polypropylene film, so that the laminar assembly may be sealed at lower temperatures. This extrusion step may occur at a stage where the base polypropylene material has already been oriented in one direction, such as the machine direction. In that case, following extrusion coating, the composite assembly is subsequently oriented in the transverse direction. Such films exhibit good heat-seal strengths, but because of the relatively high melting point of the prior art copolymer skin resins, including resins such as ethylene-propylene copolymers, the temperature range over which usable heat-seals may be formed is quite narrow. Moreover, when attempts are made to peel apart layers of such coated films after they have been heat-sealed together, it has been found that during rupture of the heat-seals to gain access to the package contents, the film layers themselves are usually ripped and torn making reclosure of the open package with the original wrapping material difficult or impossible.

It has been known in the past to prepare oriented polypropylene films having a coextruded coating layer comprising low density polyethylene, the polyethylene having been prepared by a free radical catalyzed polymerization process. In this case, because of the lower melting point of the polyethylene skins, a broader sealing range is achieved. However, such films have shown poor adhesion between the polyethylene skin layer and the polypropylene core layer resulting in a tendency for the layers to separate during heat-sealing operations. Consequently, the seal strengths provided by such low density polyethylene skin layers are not as high as the minimum heat-seal strengths required for commercial applications. Moreover, the haze and gloss values of such films are much poorer than those exhibited by the uncoated oriented polypropylene base film.

SUMMARY OF THE INVENTION

In accordance with the present invention, a resinous coating material has been found which, when applied to oriented polypropylene substrate films, results in a laminar construction which exibits excellent heat-seal strength characteristics over a wide range of heat-seal temperatures and, additionally, the heat-seals formed on such laminar constructions may be manually peeled apart by the user without rupturing or damaging the film layers. This may now be accomplished by forming a thin coating on the surface of the polypropylene substrate of an ethylene-vinyl acetate copolymer which is characterized by having from about 6% to about 20% by weight of vinyl acetate present in the copolymer structure. A particularly preferred range of vinyl acetate is from about 6% up to about 10% by weight of the copolymer.

DESCRIPTION OF SPECIFIC EMBODIMENTS

As hereinbefore discussed, the primary objective of the present invention is to offer a method which may be employed in the manufacture of oriented polypropylene films which are heat-sealable over a wide range of temperatures; which provide a high level of heat-seal strength; which offer good optical clarity; and which offer strong yet peelable heat-seal characteristics. In accordance with the present invention, films may be produced which provide strong and peelable heat seals, and they may be routinely manufactured without the need for any special equipment. This object may be achieved with either a single layer polypropylene film, when a transparent low haze film is desired, or in conjunction with a polypropylene product such as a coextrusion of a polypropylene core with pigmented surface layers. In accordance with a specific embodiment of the present invention, a polypropylene base web is extruded and subsequently oriented in the machine direction by passing the base web through a series of draw rollers utilizing conventional prior art film orientation techniques. The machine direction oriented basesheet may be subsequently extrusion coated with a thin layer of ethylene-vinyl acetate copolymer. After extrusion coating, the coated machine direction oriented polypropylene base film is subsequently preheated and stretched in the transverse direction utilizing conventional film orientation equipment such as, for example, a textile type tenter frame. In accordance with the method of the present invention, it has been found highly desirable to control the preheating prior to transverse direction orientation of the base web, so that the preheating step is at a gradual rate of no greater than 40° F. per second. This heating rate is defined as the average increase in web temperature prior to transverse direction orientation over the time in seconds this increase is accomplished. Excessively rapid heating rate results in reduced peelability and poor gauge uniformity.

Accordingly, in accordance with the present process, it is preferred to operate in a range of preheat rates between 5° F. per second and 40° F. per second with a preferred preheat range of 15° F. to 25° F. per second. Furthermore, it is noted that the gauge uniformity of the resulting transverse direction oriented web is greatly improved by maintaining this low heating rate as it allows time for non-uniform thermal conditions introduced by necessity in the extrusion coating and quenching step to equilibrate and be equalized prior to the actual transverse direction orientation or stretching. It has also been found in accordance with the present invention, that a highly desirable vinyl acetate content in the copolymer coating layer is from about 6% up to about 10% by weight.

Biaxially oriented polypropylene films were produced with ethylene-vinyl acetate coatings utilizing an extrusion coating procedure wherein a base polypropylene sheet was extruded and oriented in the machine direction utilizing a series of heated metal rollers. An ethylene-vinyl acetate copolymer coating was then applied as a melt coating to the machine direction oriented polypropylene by a second extruder. The applied coating was welded to the polypropylene by passing the coated basesheet onto a cold metal casting drum equipped with a pressure roller or air knife on the uncoated side of the machine direction oriented sheet, to quench the coating and bond it to the basesheet. The composite two-layer web was subsequently reheated at less than 40°/second to orientation temperature and oriented in the transverse direction utilizing a tenter unit. The resultant product was a biaxially oriented layer of polypropylene which offered strength and barrier characteristics, and a coating layer on the surface of the polypropylene of an ethylene-vinyl acetate copolymer which imparted strong and peelable seals over a wide sealing temperature range to the polypropylene.

The specific technique employed for gradual reheating at approximately 20° F. per second was to employ infra-red heaters on either one or both sides of the extrusion coated web. These heaters were placed both before the tenter frame and/or in the approximately parallel sections of the tenter frame, the key factor being that the rate of heating described above was maintained throughout the entire preheating of the machine direction oriented web, after extrusion coating and prior to stretching in the transverse direction.

EXAMPLE 1

A 1.50 mil ethylene-vinyl acetate coated oriented polypropylene film was produced utilizing the hereinbefore described method. The polypropylene resin had a density of 0.905 and a melt flow of 4.5. The ethylene-vinyl acetate coating layer resin had a vinyl acetate content of about 4% by weight, a melt index of 1.0 and a density of about 0.928. Conventional slip and antiblock additives were present in the resins. The base polypropylene film during machine direction orientation was stretched utilizing a stretching ratio of 5:1 at a temperature of between 275° F. and 300° F. After coating, the machine direction oriented polypropylene was stretched in a ratio of 8:1 in the transverse direction at a temperature between 250° F. and 310° F. The resultant coated film product had a coating thickness of about 25% of the overall film thickness.

EXAMPLE 2

The procedure of Example 1 was followed except the coating was a 8% vinyl acetate content ethylene-vinyl acetate copolymer, with a melt index of 3.0 and a density of about 0.930.

EXAMPLE 3

The procedure of Example 1 was followed except total film thickness was 0.90 mil, with a 8% vinyl acetate content ethylene-vinyl acetate copolymer with a melt index of 3.0 and a density of about 0.930 and a coating thickness of about 10%.

EXAMPLE 4

The procedure of Example 1 was followed except total film thickness was 0.70 mil, with a 8% vinyl acetate content ethylene-vinyl acetate copolymer with a melt index of 3.0 and a density of 0.930 and coating thickness of about 10%.

EXAMPLE 5

The procedure of Example 1 was followed except the coating was a 12% vinyl acetate content ethylene-vinyl acetate copolymer with a melt index of 2.5 and density of 0.940.

EXAMPLE 6

The procedure of Example 1 was followed except the heating rate prior to transverse direction orientation was slightly in excess of 40° F. per second.

The data contained in the following Table 1 sets forth the physical properties of the coated films produced in accordance with the preceeding examples, as well as the heat-seal characteristics of the coated film products.

TABLE 1

| Example | | 1 | 2 | 3 |
|---|---|---|---|---|
| Gage (mils) | | 1.50 | 1.50 | 0.90 |
| Percent coating thickness | | 25 | 25 | 10 |
| % VA in coating | | 4 | 8 | 8 |
| Density of Coating | | 0.928 | 0.930 | 0.930 |
| EVA-to-EVA Crimp Seals (¾ sec. at 20 psi) | | | | |
| 200° F. | | 225 pd* | 215 cd** | 310 cd |
| 220 | | 775 pd | 600 cd | 300 cd |
| 240 | | 500 pd | 660 cd | 335 cd |
| 260 | | 520 pd | 560 cd | 360 cd |
| 280 | | 490 pd | 530 cd | 465 cd |
| Modulus (mpsi) | MD | 269 | 257 | 249 |
| | TD | 688 | 630 | 638 |
| Elongation (%) | MD | 197 | 232 | 196 |
| | TD | 29 | 28 | 27 |
| Ultimate (mpsi) | MD | 12.0 | 11.5 | 13.1 |
| | TD | 51.9 | 42.3 | 45.4 |
| Stiffness (g/4") | MD | 17.5 | 17.3 | 6.6 |
| | TD | 37.9 | 39.8 | 11.7 |
| % Dimension Chg. | MD | 3.0 | 1.1 | 4.2 |
| (275° F. for 7 Min) | TD | 5.6 | 2.9 | 5.3 |
| Gloss at 45° | | 86.8 | 75.7 | 93.6 |
| Haze % | | 1.5 | 3.4 | 0.6 |
| WVTR gr/100in²/24 hrs. at 100° F., 90% RH | | 0.24 | 0.28 | 0.50 |

| Example | | 4 | 5 | 6 |
|---|---|---|---|---|
| Gage (mils) | | 0.70 | 1.50 | 1.50 |
| Percent coating thickness | | 10 | 25 | 25 |
| % VA in coating | | 8 | 12 | 4 |
| Density of Coating | | 0.930 | 0.940 | 0.928 |
| EVA-to-EVA Crimp Seals (¾ sec. at 20 psi) | | | | |
| 200° F. | | 170 cd | — | — |
| 220 | | 177 cd | 725 pd | 515 |
| 240 | | 205 cd | 800 pd | 650 T*** |
| 260 | | 200 cd | 595 cd | 410 T |
| 280 | | 275 cd | 820 pd | 540 T |
| Modulus (mpsi) | MD | 252 | 220 | 265 |
| | TD | 677 | 371 | 618 |
| Elongation (%) | MD | 217 | 200 | 186 |
| | TD | 29 | 37 | 34 |
| Ultimate (mpsi) | MD | 14.1 | 10.5 | 12.7 |
| | TD | 48.6 | 18.9 | 43.8 |
| Stiffness (g/4") | MD | 3.4 | 14.4 | 15.9 |
| | TD | 6.3 | 22.5 | 32.8 |
| % Dimension Chg. | MD | 5.1 | 4.1 | 4.0 |
| (275° F. for 7 Min) | TD | 7.1 | 5.2 | 2.8 |
| Gloss at 45° | | 92.3 | 76.3 | 85.6 |
| Haze % | | 1.1 | 3.3 | 2.0 |

TABLE 1-continued

| | | | |
|---|---|---|---|
| WVTR gr/100in$^2$/24 hrs. at 1000° F., 90% RH | 0.55 | — | 0.30 |

*pd partial delamination
**cd complete delamination
***T film torn

It is apparent from the preceeding Table that the heat-seal characteristics of the coated films produced in accordance with Example 1, wherein the ethylene-vinyl acetate copolymer coating had low weight percentage of vinyl acetate, e.g. on the order of about 4%, produced films which when heat-sealed could not be peeled apart to complete sealed layer delamination. The layers could only be partially peeled or delaminated before they ruptured and tore. As the vinyl acetate content was increased up to about 8% as shown by the film samples produced in accordance with Examples 2, 3 and 4, peelable seals were achieved which had good heat-seal strength characteristics. However, when the vinyl acetate content was further raised to 12% as shown in Example 5, peelability was substantially reduced. It is theorized that this reduction was a consequence of the 20° F. heating rate used being sufficient to allow the softer 12% vinyl acetate copolymer to melt and then penetrate the machine direction oriented sheet and form an inseparable bond after transverse direction orientation. This theory is further supported in Example 6 where a heating rate slightly in excess of 40° F. was used and actual film tearing occurred at most of the sealing temperatures.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for producing coated biaxially oriented polypropylene film, said film being adapted for heat sealing in a manner whereby the seal may be peeled apart without damaging the film layers in the seal area, which comprises the sequential steps of:
    a. Extruding a polypropylene base film and orienting said film in the longitudinal direction;
    b. Extrusion coating at least one surface of said oriented film with a single layer of an ethylene-vinyl acetate copolymer coating to form a coated film, said copolymer containing from about 6% up to about 10% by weight vinyl acetate in said copolymer;
    c. Preheating said coated film at a heating rate of above about 5° F. per second and below about 40° F. per second; and
    d. Orienting the resultant preheated coated film in the transverse direction.

* * * * *